C. M. SMITH AND H. WEIGAND.
ABSORBENT MATERIAL FOR USE IN ICE MACHINES.
APPLICATION FILED MAR. 5, 1920.

Patented June 28, 1921.

Inventors:
Curtis M. Smith,
Herman Weigand,

UNITED STATES PATENT OFFICE.

CURTIS M. SMITH, OF WASHINGTON, DISTRICT OF COLUMBIA, AND HERMAN WEIGAND, OF BAXTER SPRINGS, KANSAS.

ABSORBENT MATERIAL FOR USE IN ICE-MACHINES.

1,383,247.      Specification of Letters Patent.      Patented June 28, 1921.

Original application filed January 16, 1919, Serial No. 271,465. Divided and this application filed March 5, 1920. Serial No. 363,422.

*To all whom it may concern:*

Be it known that we, CURTIS M. SMITH, a citizen of the United States, and resident of Washington, District of Columbia, and HERMAN WEIGAND, of Baxter Springs, Kansas, have invented certain new and useful Improvements in Absorbent Materials for Use in Ice-Machines, of which the following is a specification.

The present specification is a division of that filed by us Jan. 16, 1919, Serial No. 271,465 for refrigerating apparatus and concerns the material used in the absorption system.

Heretofore it has been proposed to use a substance such as nitrate of ammonium in a rotating cylinder for receiving the spent gas, which goes into solution with the nitrate but such a system requires the use of a rotating cylinder in order to keep the absorption effective and even so the absorption power of the nitrate is limited. The material which we have produced requires no agitation by means of moving cylinders or otherwise and it will absorb a large proportion of the ammonia gas, the absorbent not going into solution.

Figure 1:
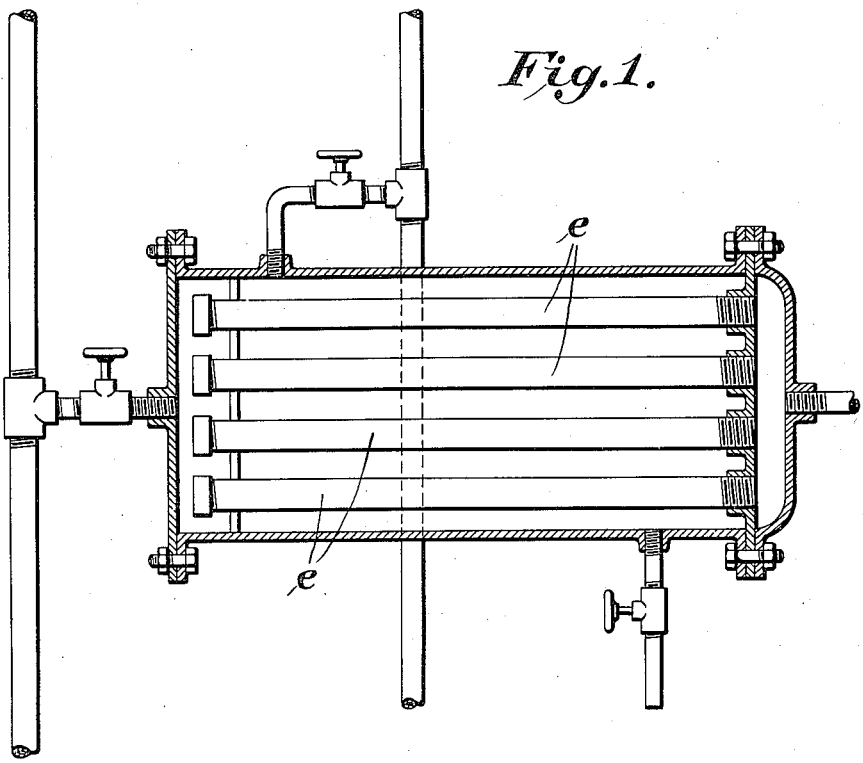
Figure 2:
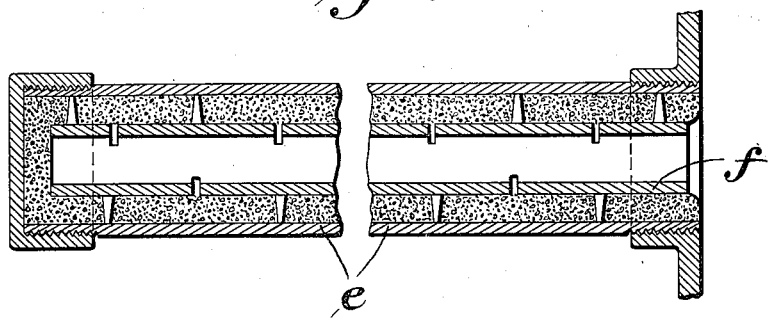

The drawing represents in Figure 1 a holder for the material, and in Fig. 2 a detail.

The material is used in a system having the usual parts, condensing coil, receiver and ice tank. The absorbent material may be contained in various ways but as explained in the said application it is held between the walls of two tubes *e* and *f*, the inner one, *f*, of which is perforated to allow the gas to pass to the material. The absorbent material is preferably composed of anhydrous calcium chlorid mixed with charcoal of granular form having a grain about that of coarse ground coffee. The chlorid and charcoal are mixed dry and are filled in the space between the two tubes and the gas reaches all parts of the mass of material through the inner perforated tube which is connected with the piping of the system. The charcoal is preferably that derived from peach stones.

After absorption has taken place the gas is cut off by a suitable valve and then the containers or tubes holding the absorbent material are subjected to heat which will volatilize and drive off the ammonia gas and this will pass to the condenser and receiver and make the circuit as usual. By having two or more units one will be absorbing while the other is generating. While absorption is taking place the containers for the material is cooled in any suitable way.

The proportions of the components of our material may vary within certain limits but preferably we use about ten per cent. of the charcoal to ninety per cent. of the anhydrous calcium chlorid. The charcoal keeps the chlorid from packing and renders it more accessible to the gas and hence increases the absorbent power of the material considered as a mass.

We may also employ, instead of the anhydrous calcium chlorid, another chemical of the deliquescent chlorid group, namely zinc chlorid, but we prefer the anhydrous calcium chlorid as we find this gives better results.

We claim:

1. An absorbent material for use in ice machines consisting of anhydrous calcium chlorid with charcoal distributed throughout the mass, substantially as described.

2. An absorbent material of the deliquescent chlorid group with charcoal distributed throughout the mass.

CURTIS M. SMITH.
         HERMAN WEIGAND.